INVENTOR
LOUIS EMILE PONSY
BY Mock + Blum
ATTORNEYS

AUTOMATIC CIRCUIT BREAKERS

Filed Dec. 28, 1953 5 Sheets-Sheet 2

INVENTOR
LOUIS EMILE PONSY
BY Mock + Blum
ATTORNEYS

June 25, 1957 L. E. PONSY 2,797,276

AUTOMATIC CIRCUIT BREAKERS

Filed Dec. 28, 1953 5 Sheets-Sheet 3

INVENTOR
LOUIS EMILE PONSY
BY Mock + Blum
ATTORNEYS

INVENTOR
LOUIS EMILE PONSY
BY Mock + Blum
ATTORNEYS

June 25, 1957 L. E. PONSY 2,797,276

AUTOMATIC CIRCUIT BREAKERS

Filed Dec. 28, 1953 5 Sheets-Sheet 5

INVENTOR
LOUIS EMILE PONSY
BY Mock + Blum
ATTORNEYS

1

2,797,276

AUTOMATIC CIRCUIT BREAKERS

Louis Emile Ponsy, Clichy, France, assignor to Etablissements Labinal, Paris, France, a society of France Application December 28, 1953, Serial No. 400,593

4 Claims. (Cl. 200—106)

The present invention relates to automatic circuit breakers, i. e. apparatus for automatically opening a circuit when the current therein exceeds a predetermined value.

The chief object of the present invention is to provide an apparatus of this kind which is better adapted to meet the requirements of practice than those existing at the present time.

My invention relates to such apparatus including, in the circuit to be controlled, cooperating contacts carried respectively by the apparatus frame and by a trip lever and it is characterized in that said trip lever, urged by resilient means toward the position which opens said contacts by moving them away from each other, is normally held in the position which keeps said contacts closed by means of a catch lever retractable from its holding position by the thrust exerted thereon by said trip lever itself urged by said resilient means, said catch lever being normally locked in holding position by a third lever held in locking position by resilient means and adapted, under the effect of overloads in said circuit, to come into a position where it releases said catch lever and enables it to retract from the position where it holds said trip lever in contact closing position.

Other features of my invention will become apparent in the course of the following detailed description of some specific embodiments thereof with reference to the accompanying drawings, given merely by way of example, and in which.

Figures 7, 8:
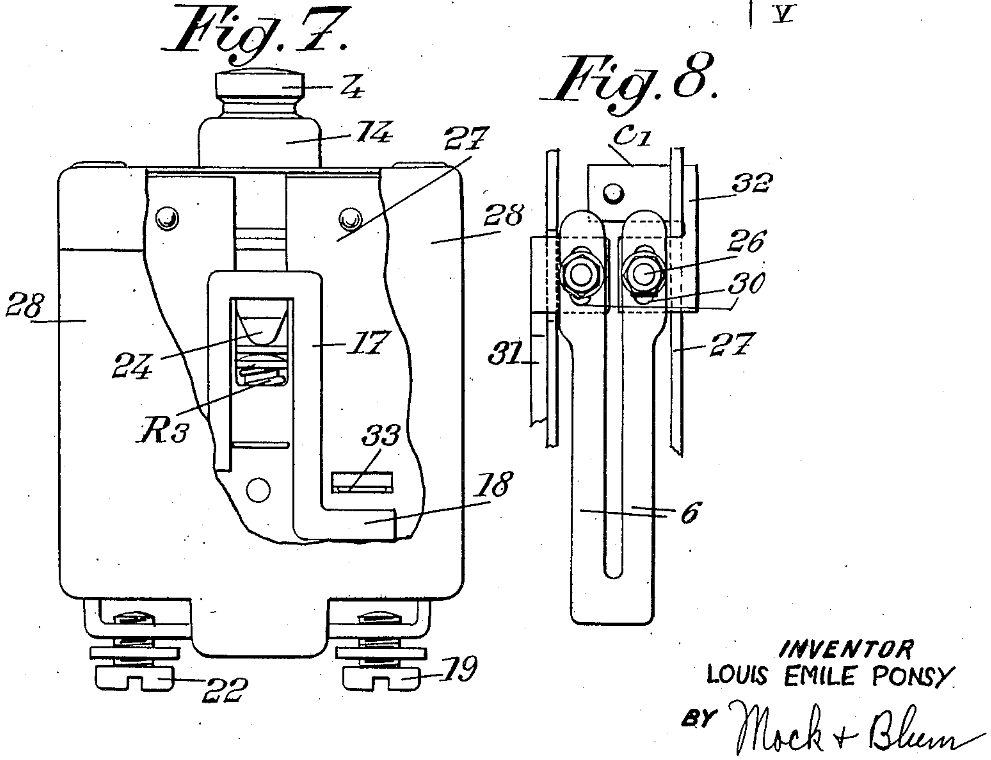
Fig. 7 is a front view of the circuit breaker of Figs. 5 and 6, with portions cut away.

Fig. 8 separately shows the bi-metallic strip belonging to the circuit breaker.

Figure 9:
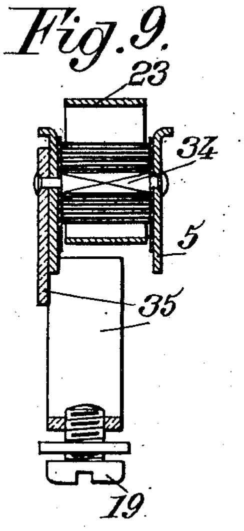

Fig. 9 separately shows the electro-magnet of this circuit breaker.

Figure 10:
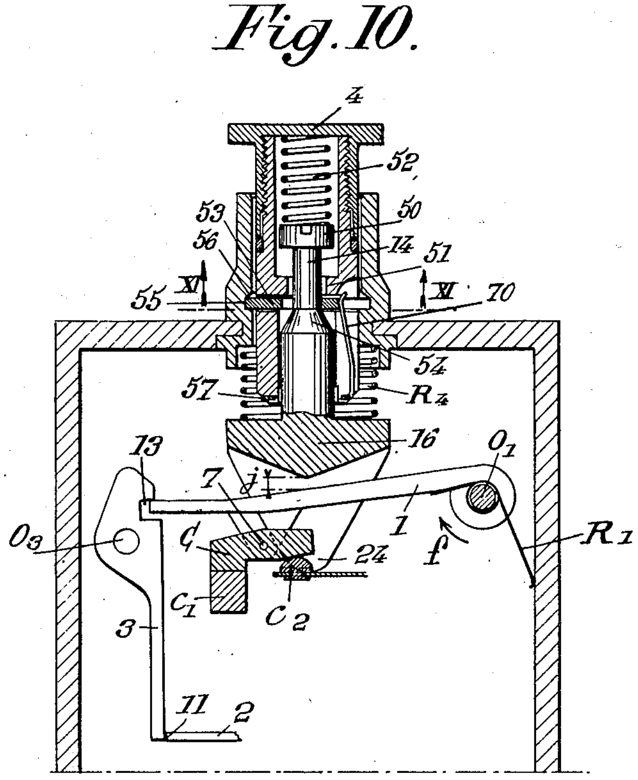
Figure 11:
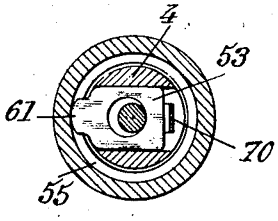

Figs. 10 and 11 are respectively a vertical section and a section on line XI—XI of Fig. 10 of a circuit breaker made according to a modification.

Figure 12:
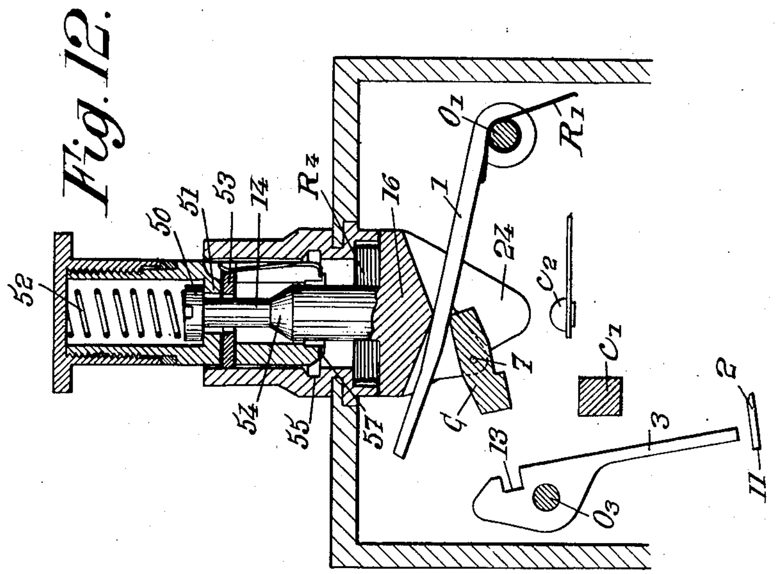
Figure 13:
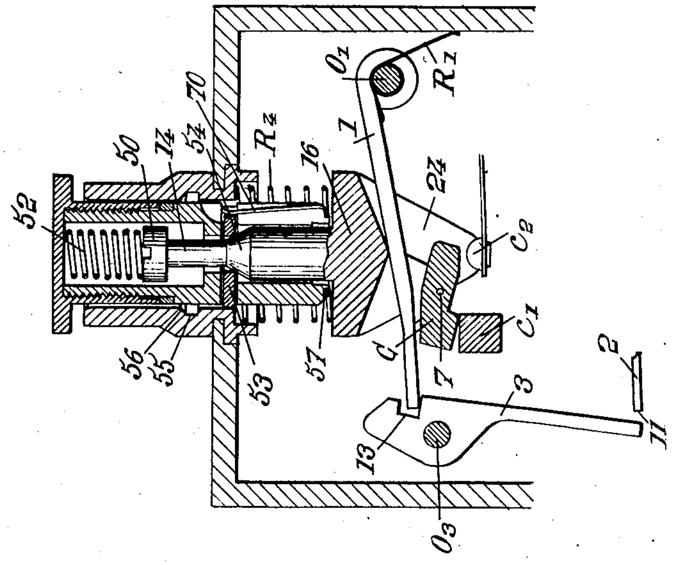

Figs. 12 and 13 are views similar to Fig. 10 showing the same apparatus with various relative positions of the parts thereof.

Figures 14, 15, 16:
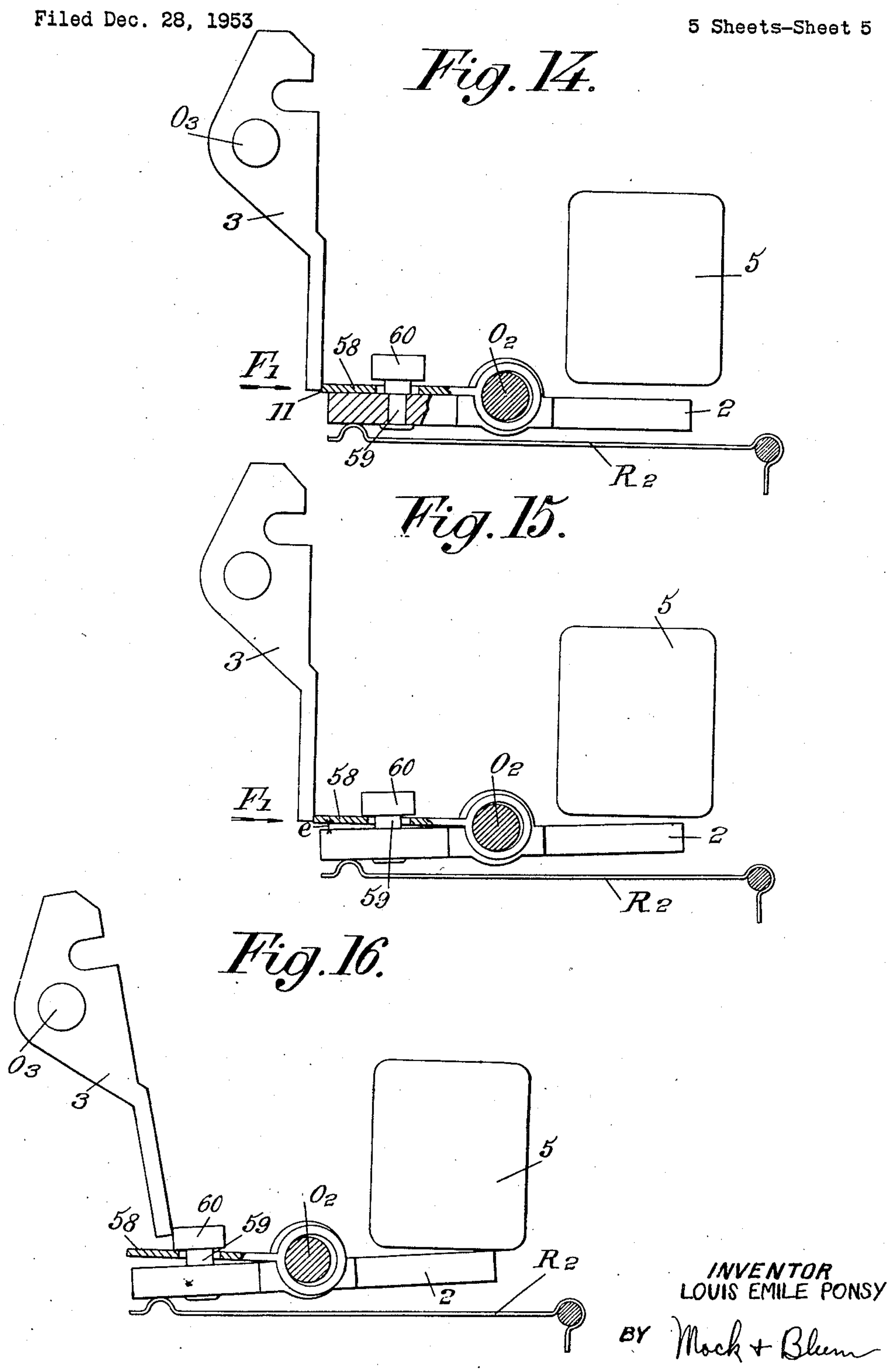

Figs. 14 to 16 diagrammatically show in elevational view with parts cut away an apparatus provided with supplementary means according to a modification.

The circuit breaker shown by way of example by the above mentioned drawings is adapted for use with low powers (for instance from 5 to 50 amperes under a voltage of 30 volts) such as employed in electric systems provided on board of an aircraft.

2

This circuit breaker includes the three following levers:

*a.* A lever 1 hereinafter called "trip lever" pivoted about an axis $O_1$ fixed with respect to the apparatus frame, this trip lever being operable from the outside of the apparatus casing by means of a knob 4;

*b.* A lever 2, hereinafter called "locking lever" pivoted about an axis $O_2$ fixed with respect to the apparatus frame and pivotable by the action of means responsive to the existence of overloads, such means being for instance constituted by an electro-magnet 5 and a bi-metallic strip 6;

*c.* A lever 3, or catch lever, pivoted about an axis $O_3$ fixed with respect to the apparatus frame.

Figure 1:
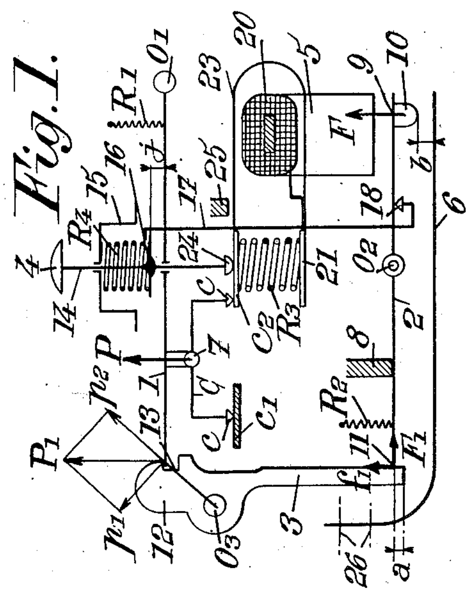
Fig. 1 is a diagrammatical view of the elements of an automatic circuit breaker made according to my invention.

The cooperating contacts provided in the electric circuit to be controlled are operated by trip lever 1 so as to be closed (in the absence of an excess of current in the circuit) when said lever 1 is in the position of Fig. 1. But the circuit breaker is arranged so that if the current in the circuit exceeds a predetermined value when the circuit breaker is being reset (by means of knob 4), the contacts open immediately upon being closed.

For this purpose, the manual action to be exerted on knob 4 for resetting the circuit breaker has for its result merely to bring the three above mentioned levers into positions preparatory to resetting proper. As long as the operator is exerting an action on said control member 4, the electric contacts cannot close. Resetting proper takes place only when the operator releases knob 4 and under the action of resilient means, so that if there is, at this time, an excess of current in the circuit, the contacts are immediately reopened against said resilient means.

Figure 3:
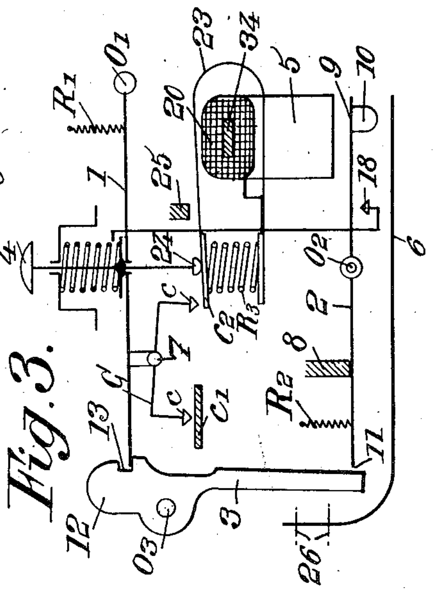
Figure 5:
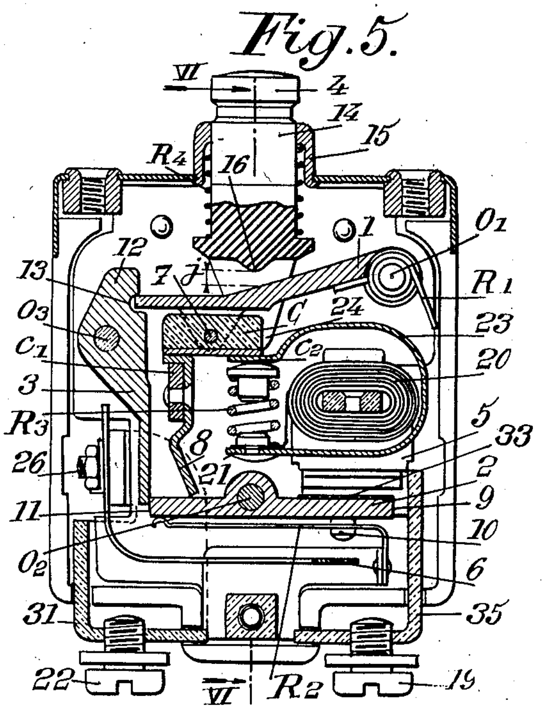
Fig. 5 is a section on the line V—V of Fig. 6 of a circuit breaker made on the lines of that of Fig. 1.

The first step of the resetting operation, corresponding to a positive action exerted manually upon knob 4, brings the parts into the position of Fig. 3. When knob 4 is released, the parts come into the position of resetting illustrated by Fig. 1 (and Fig. 5). It will be noted that in this position there remains, between trip lever 1 and the portion of knob 4 that is intended to cooperate with said trip lever, a play or clearance *j* sufficient to enable the tripping of lever 1 under the effect of an excess of current in the electric circuit.

The resilient means which bring lever 1 into the resetting position when knob 4 is released after having been depressed consist of a return spring $R_1$ which urges said lever 1 upwardly from the preparatory position of Fig. 3 into that of Fig. 1.

Advantageously, as shown by the drawing, there are two pairs of cooperating contacts, one contact *c* of every pair being carried by one end, respectively, of a lever C pivoted at 7 at its middle part. One of these contacts *c* cooperates with a fixed contact $C_1$ (which is preferably adjustable) and the other one cooperates with a contact $C_2$ movable in response to the depressing of knob 4, against the action of a spring $R_3$.

Locking lever 2 is preferably balanced about its pivot axis $O_2$ and subjected to the action of an adjustable spring $R_2$ which applies it against an adjustable abutment 8. Lever 2 is then in its locking, or normal, position (Figs. 1 and 3).

This lever 2 is adapted to be subjected, at the end 9 thereof, to the action of either electro-magnet 5 or bi-metallic strip 6 (arranged to bear against a projection 10 of lever 2). The other end 10 of lever 2 is arranged to cooperate with catch lever 3.

This catch lever 3 which, in its holding position, shown by Fig. 1, is substantially at right angles to levers 1 and 2, has a rounded head 12, provided with a notch 13 adapted to accommodate the free end of trip lever 1. The tail of this lever 3 is adapted to cooperate with locking lever 2 so that either the tail end of locking lever 2 rests upon the end of catch lever 3, when the contacts of the circuit breaker are open (Fig. 2) or, on the contrary, catch lever 3 bears against the end 11 of locking lever 2 (Fig. 1).

Control knob 4 is rigid with a rod 14 slidably guided in a part 15 of the frame of the circuit breaker. This rod can act upon trip lever 1 only in one direction, to wit the downward one, through an abutment 16 coming into contact with trip level 1.

Rod 14 further carries another abutment 24 adapted to cooperate with contact $C_2$ and so positioned that, before abutment 16 can come into contact with trip lever 1, abutment 24 has depressed contact $C_2$ downwardly against the action of spring $R_3$ to such a distance that contacts *c* and $C_2$ no longer cooperate together.

Cooperation of contacts $C_1c$ and $C_2c$ can take place only when, knob 4 being released by the operator, rod 14 moves up from the position of Fig. 3 to that of Fig. 1 under the action of spring $R_3$. During the same time, trip lever 1 has been moving upwardly under the action of spring $R_1$. But at the end of this movement, a clearance *j* exists between the trip lever and abutment 16, as above stated.

Preferably, knob 4 will be further subjected to the action of a small spring $R_4$ which urges it downwardly.

The circuit breaker further includes means for manually opening the electric contacts by means of knob 4, said means including a pulling rod 17 adapted to act at 18 upon the locking lever 2.

Figure 4:
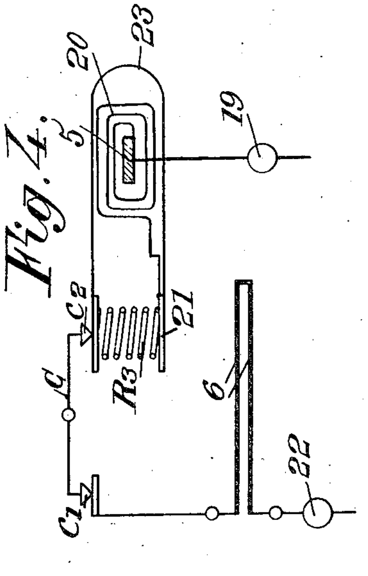
Fig. 4 shows the electric lay-out of the apparatus.

The electric connections are shown by Fig. 4.

The current, flowing in for instance through 19, passes through the winding 20 of electro-magnet 5, arrives at 21 in a piece acting as an abutment for spring $R_3$, passes through contacts $C_2$, *c*, *c*, $C_1$, then through bi-metallic strip 6 and leaves through terminal 22.

Figure 2:
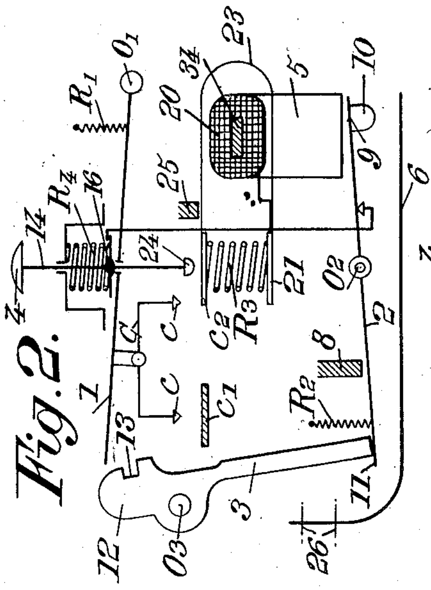
Figs. 2 and 3 are views of the same circuit breaker in two different positions of the elements thereof.

Advantageously, to connect piece 21 and contacts $C_2$ (which must be free to move), I provide a flexible connection such as a strip 23, passing around electro-magnet 5 and the upward displacement of which is limited by a fixed abutment 25 (Figs. 1 to 3). The elasticity of this connection 23 is added to that of spring $R_3$. The loop constituted by this connection 23 might replace winding 20.

This circuit breaker works as follows:

The circuit being supposed to have been opened and the parts being in the position of Fig. 2, resetting is achieved by depressing knob 4. This action moves trip lever 1 downwardly, together with the pivot point 7 of lever C which carries contacts *c*, *c*. But before contacts *c* have been able to cooperate with contacts $C_1$ and $C_2$, the rod 14 of knob 4 has acted through its end 24 upon contact $C_2$ and deformed both spring $R_3$ and resilient connection 23. In other words, although contacts *c* have been moved toward contacts $C_1$ and $C_2$, contact $C_2$ has been retracted to a still greater degree so that the circuit remains open.

Simultaneously with this, the free end of trip lever 1 has come to bear upon the lower edge of the notch 13 of catch lever 3, causing this lever to pivot in the clockwise direction and enabling locking lever 2 to return into locking position under the effect of spring $R_2$. The parts are then in the position of Fig. 3.

In order to close the electric circuit, knob 4 must be released so as to allow trip lever 1 to move upwardly under the action of spring $R_1$. This trip lever 1 is limited in this upward movement by its free end coming into contact with the upper edge of notch 13. At the same time, spring $R_3$ moves contact $C_2$ upwardly and contacts *c*, *c* are then applied against contacts $C_1$ and $C_2$ respectively.

The parts are now in the position of Fig. 1. There remains between trip lever 1 and the abutment 16 of knob 4 a play *j* which permits trip release, either instantaneously under the action of electro-magnet 5 on locking lever 2 at 9, or with delay under the action of the bimetallic strip 6 on said lever 2. This release is produced by the action of force F on lever 2.

It may be demonstrated that this force F may be small. It depends in fact only upon pressure P, which is the resultant of the pressure at contacts $C_1$, $C_2$ exerted upon the axis 7 of lever C, this pressure being itself determined by the adjustment of spring $R_3$. Pressure P is transformed into a force $P_1$ at the free end of trip lever 1, which force $P_1$ may be decomposed into two elementary forces $p_1$ and $p_2$, one of which, to wit $p_2$, passes through pivot axis $O_3$. Force $p_1$ produces a torque which is balanced by another torque exerted by a force $F_1$ passing through the pivot axis $O_2$ of locking lever 2. Finally, the tripping force F must balance, with respect to axis $O_2$, the friction force $f_1$ exerted by $F_1$ between the end 11 of locking lever 2 and lever 3, account being also taken of the force exerted by return spring $R_2$.

By way of example, for a contact pressure P averaging 500 gr. (which achieves full safety between contacts for a current intensity of about 5 amperes), force F may be equal to about 50 gr.

It should be noted that all adjustments can be made independently in an apparatus of this kind, in particular:

*a*. adjustment of mechanical tripping, that is to say of the distance *a* (Fig. 1) which represents the displacement to be imparted to the end 11 of lever 2 to obtain tripping, this adjustment being obtained by acting upon abutment 8;

*b*. adjustment of the magnetic means, that is to say of the effort to be exerted by the electro-magnet, this adjustment being effected in particular by acting upon spring $R_2$;

*c*. adjustment of the thermal means, which may be effected by modifying the distance *b* between the bimetallic strip and its abutment 10, in particular by fixing this bi-metallic strip in adjustable fashion at 26 on the casing of the apparatus.

Manual tripping is obtained by pulling knob 4, which acts on lever 2 at 18 through rod 17.

I will now describe the construction of Figs. 5 to 8.

The same elements are designated by the same reference numerals. The general arrangement is the same as above described and the operation is the same.

Figure 6:
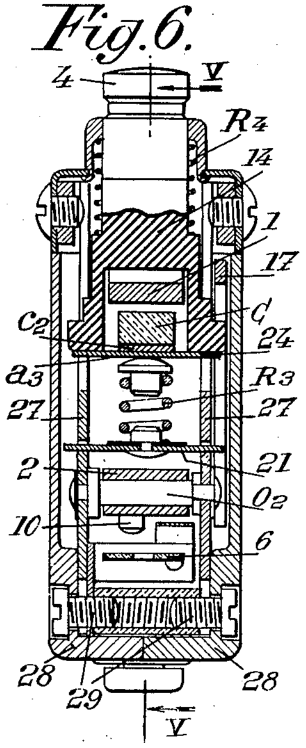
Fig. 6 is a section on the line VI—VI of Fig. 5.

In order to obtain a very accurate mounting of the lever pivot axes, these axes are supported by two insulating side plates 27 mounted inside the apparatus casing. Fig. 6 shows how these insulating plates 27 are fixed on the two casing elements 28 assembled together by means of screws 29. Piece 21, which acts as a support for spring $R_3$, is fixed to side plates 27 through which it extends.

The mounting of the bimetallic strip, adjustable at 26 owing to elongated apertures 30, is visible in Fig. 8. The two branches thereof are fixed on metallic pieces 31, 32, one of which, 31, carries terminal 22, and the other, 32, carries contact surface $C_1$. Piece 32 also carries abutment 8.

The rod 14 of knob 4, in Figs. 5 to 8, is provided, at the base thereof, with a kind of fork extending on either side of trip lever 1 and the ends 24 of which can act freely upon flexible connection 23.

Rod 17 (Figs. 6 and 7) acts through its end 18 on a side projection 33 carried by locking lever 2.

The magnetic circuit of the electro-magnet is constituted, as shown by Fig. 9, by a core 34 fixed to two magnetic side plates 5, the whole being mounted on a brass plate 35 which carries terminal 19. The winding 20 is constituted for instance by a conductor strip wound on said core. As for flexible connection 23, which is riveted on the output end of the winding at 21, it is fitted between the two side plates 27 without any rivet or screw.

In an apparatus such as above described, when the circuit breaker is in set position, there is nothing to prevent any one from depressing the knob, which temporarily cuts off the contacts. Now, such a cutting off of the circuits is undesirable in most cases.

Therefore, according to a modification, I provide means for making it impossible to depress the knob when it is in the position it has been given after resetting. According to this modification, it will be possible to push down the knob only after the circuit breaker has tripped open and from the position which is then assumed by the parts of the apparatus. The means just above described are made as follows:

The knob, instead of acting directly upon the contact mechanism, is mounted slidable on a rod which carries the push-piece intended to act on said mechanism. Locking means are combined with this system, these locking means being capable of holding the knob in the position it has been given after resetting, while being made inoperative when the circuit breaker trips open and being left in this inoperative position until the knob has been fully depressed for resetting, after which the locking action again becomes effective.

According to the embodiment illustrated by Figs. 10 to 13, knob 4, which is hollow, contains a rod 14 one end of which forms an abutment 50 cooperating with a shoulder 51 of the knob body. The other end of rod 14 is provided with a push-piece 16, 24 of the kind above described, portion 16 being intended to cooperate with trip lever 1 and portion 24 with contact $c_2$.

Between rod 14 and knob 4, there is advantageously interposed a small spring 52.

The locking device is constituted by a locking member 53 slidable in slots of the knob body and through which passes rod 14. This rod includes a conical or similar surface 54. Locking member 53 is provided with a projection 61 capable of cooperating with a circular groove 55 the top face 56 of which is conical with the apex of the cone directed upwardly.

I further provide a small spring $R_4$ which keeps the push-piece applied against the contact or contact-carrier $c_2$, in the set position (Fig. 10).

Such a system works as follows:

If it is supposed first that the circuit breaker is in circuit closing position, it is clear that nothing opposes automatic tripping. This is due to the fact that, owing to the existence of play $j$ (Fig. 10) above referred to, the release of levers 1, 2, 3 can take place under the effect of the action exerted upon locking lever 2. Trip lever 1 then comes to bear upon push-piece 16 under the effect of the whole force of spring $R_1$, which moves the whole of the push-knob outwardly, locking member 53 leaving its groove 55 owing to the conical shape of the top portion 56 thereof. Accordingly, the circuit is broken at $c_1Cc_2$: this position is shown by Fig. 12.

For resetting the apparatus, it suffices, starting from this position, to push down the knob and to drive it right into the casing as shown by Fig. 13. Spring 52, which is weaker than spring $R_1$, is compressed until the base of the knob, at 57, comes into contact with push-piece 16. Conical portion 54 keeps locking member 53 into its retracted position, whereby it can move freely past groove 55.

The knob is then released, the whole first moving upwardly a distance equal to $j$, after which the knob keeps moving alone under the effect of spring 52 until locking member 53, being no longer acted upon by conical surface 54, drops into its groove. It is now impossible to depress the push-knob once more.

According to another feature of my invention, especially illustrated by Figs. 14 to 16, I provide means whereby locking lever 2 (which pivots about axis $O_2$), instead of being, in locking position, in direct contact with catch lever 3, which may produce in some cases undesirable frictional stresses when the circuit breaker trips open, acts through an intermediate piece having a given play with respect to said locking lever.

In these conditons, when the circuit breaker trips open, the force to be overcome by the locking lever at the beginning of its displacement will be practically zero, said locking lever pivoting freely about its axis. It is then given a high acceleration until the above mentioned play is taken up, and the energy due to the velocity acquired by the lever will produce a shock which will immediately release the catch lever in perfectly safe conditions and without requiring too high a power from electro-magnet 5 or bi-metallic strip 6.

In the example illustrated by Figs. 14 to 16, the intermediate piece consists of a small lever 58 freely rotatable about axis $O_2$ and the end 11 of which is adapted to cooperate with catch lever 3.

This small lever 58 is provided with an aperture through which passes a pin 59 carrying a head 60. A return spring $R_2$ acts upon locking lever 2.

Figs. 14 to 16 illustrate the successive steps of the operation. The normal position is that shown by Fig. 14.

As soon as electro-magnet 5 (or the bi-metallic strip which is not shown) urges locking lever 2, this lever moves first freely without driving auxiliary lever 58 (Fig. 15), then, when this movement has been started and after an angular displacement of an amplitude equal to $e$, head 60 strikes lever 58 which immediately releases catch lever 3 (Fig. 16). For resetting, everything takes place as if lever 58 were rigid with locking lever 2 with which it might possibly be connected with a small spring.

Of course, the apparatus just above described can be tripped open not only automatically but also manually by pulling the knob as in the first described embodiments. The inclined upper face 56 of groove 55 then enables locking member 53 to leave said groove.

In a general manner, while I have, in the above description, disclosed what I deem to be practical and efficient embodiments of my invention, it should be well understood that I do not wish to be limited thereto as there might be changes made in the arrangement, disposition and form of the parts without departing from the principle of the present invention as comprehended within the scope of the accompanying claims.

What I claim is:

1. An automatic circuit breaking device which comprises, in combination, a frame, a trip lever pivotable in said frame between a first position and a second position, a switch for opening and closing the circuit to be controlled, said switch including a bridge contact carried by said lever, a pair of contacts carried by said frame for cooperation with said bridge contact, at least one of said contacts carried by said frame being movable with respect thereto so that said bridge contact is held away from said movable contact for said first position of said trip lever and is moved toward said movable contact in response to the shifting of said trip lever from said first to said second position thereof, a catch lever pivotable in said frame to occupy either of two positions, to wit a normal one and a retracted one, holding means carried by said catch lever arranged to cooperate with said trip lever when said catch lever is in normal position to keep said trip lever in a third position, intermediate between the first and second ones from pivoting toward its first position, said holding means being arranged to release said trip lever in response to the shifting of said catch lever from its normal position to its retracted position, resilient means interposed between said frame and said trip lever for urging the latter toward said first position thereof, whereby said catch lever is urged through its holding means toward its retracted position when said holding means are in cooperating contact with said trip lever, a third lever pivotable in said frame between two positions, to wit a locking one and a releasing one, means carried by said third lever to cooperate with said catch lever for holding the latter in normal position against the action of said resilient means when said third lever is in locking position and for leaving said catch lever free to pivot when said third lever is in releasing position, resilient means for urging said third lever toward its locking position, releasing means for bringing said third mentioned lever in its releasing position against the action of said last mentioned resilient means, overload responsive electric means inserted in said circuit in series with said switch for operating said releasing means, a manual resetting device for actuating said trip lever including a member slidable with respect to said lever with a limited play in a direction transverse both thereto and to the pivot axis thereof, said member being shaped and located to cooperate with said contact movably carried by said frame so as to retract it away from said bridge contact carried by said trip lever when said trip lever is being moved from its first toward its second position by said resetting member, resilient means carried by said frame for urging said contact movably carried by said frame toward said bridge contact carried by said trip lever, whereby said two last mentioned contacts can cooperate together when said resetting member is released after its active resetting displacement, and safety means for preventing further movement of said resetting member in the direction which moves said trip lever from third to second position after resetting has already been performed.

2. A circuit breaking device according to claim 1 in which said resetting device includes, in combination with said resetting member, a locking piece movable transversely to the direction of movement of said resetting member, said frame being provided with a groove slidably to accommodate said locking member, and a piece slidable in said member in said direction of movement, an inclined surface being provided on said piece to retract said locking member from said groove for a relative displacement of said member and said piece engaging them in each other.

3. An automatic circuit breaking device which comprises, in combination, a frame, a trip lever pivotable in said frame between a first position and a second position, a switch for opening and closing the circuit to be controlled, said switch including a bridge contact carried by said lever, a pair of contacts carried by said frame for cooperation with said bridge contact, at least one of said contacts carried by said frame being movable with respect thereto so that said bridge contact is held away from said movable contact for said first position of said trip lever and is moved toward said movable contact in response to the shifting of said trip lever from said first to said second position thereof, a catch lever pivotable in said frame to occupy either of two positions, to wit a normal one and a retracted one, holding means carried by said catch lever arranged to cooperate with said trip lever when said catch lever is in normal position to keep said trip lever in a third position, intermediate between the first and second ones from pivoting toward its first position, said holding means being arranged to release said trip lever in response to the shifting of said catch lever from its normal position to its retracted position, resilient means interposed between said frame and said trip lever for urging the latter toward said first position thereof, whereby said catch lever is urged through its holding means toward its retracted position when said holding means are in cooperating contact with said trip lever, a third lever pivotable in said frame between two positions, to wit a locking one and a releasing one, means carried by said third lever to cooperate with said catch lever for holding the latter in normal position against the action of said resilient means when said third lever is in locking position and for leaving said catch lever free to pivot when said third lever is in releasing position, resilient means for urging said third lever toward its locking position, releasing means for bringing said third mentioned lever in its releasing position against the action of said last mentioned resilient means, overload responsive electric means inserted in said circuit in series with said switch for operating said releasing means, a part in contact with said catch lever movable with respect to said locking lever and means for limiting the movement of said part with respect to said locking lever, whereby the said locking lever is started from locking toward releasing position and is given momentum before said part releases said catch lever.

4. A circuit breaking device according to claim 3 in which said part is a small lever pivoted to said locking lever with a limited lost motion, the edge of said small lever being normally applied against said catch lever.

References Cited in the file of this patent

UNITED STATES PATENTS

| | | |
|---|---|---|
| 570,212 | Wurts | Oct. 27, 1896 |
| 1,360,280 | Evans | Nov. 30, 1920 |
| 2,057,093 | Geisslinger | Oct. 13, 1936 |
| 2,182,038 | Soulat | Dec. 5, 1939 |

FOREIGN PATENTS

| | | |
|---|---|---|
| 145,766 | Austria | May 25, 1936 |
| 438,473 | Germany | Dec. 18, 1926 |